July 28, 1925.

A. E. GOURDIER ET AL 1,547,382

THERMOSTATIC ELECTRIC MOTOR PROTECTION

Filed Jan. 13, 1922    2 Sheets-Sheet 1

Inventors
Arthur E. Gourdier,
Charles B. Eggleston
and George M. Gourdier

By Lancaster and Allwine

Attorneys

July 28, 1925.
A. E. GOURDIER ET AL
1,547,382
THERMOSTATIC ELECTRIC MOTOR PROTECTION
Filed Jan. 13, 1922  2 Sheets-Sheet 2
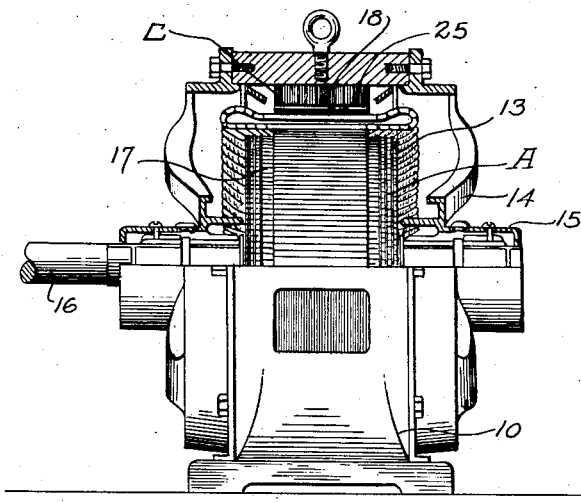
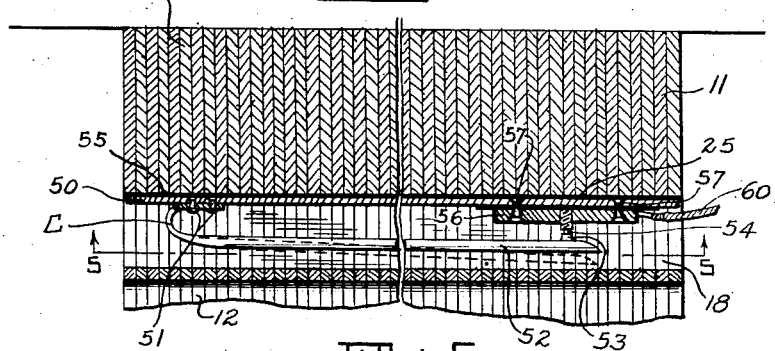
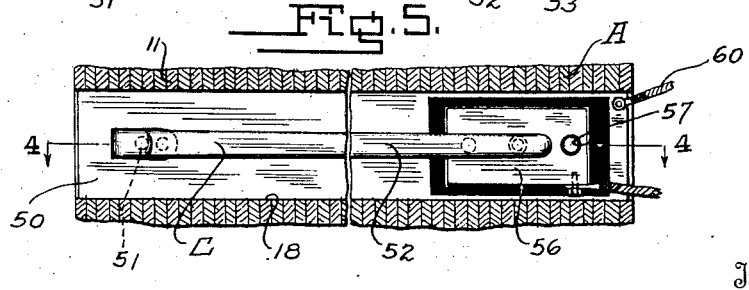
Inventors
Arthur E. Gourdier,
Charles B. Eggleston
and George M. Gourdier.
By Lancaster and Allwine
Attorneys

Patented July 28, 1925.

1,547,382

UNITED STATES PATENT OFFICE.

ARTHUR E. GOURDIER, CHARLES B. EGGLESTON, AND GEORGE M. GOURDIER, OF SANTA CRUZ, CALIFORNIA.

THERMOSTATIC ELECTRIC-MOTOR PROTECTION.

Application filed January 18, 1922. Serial No. 528,921.

*To all whom it may concern:*

Be it known that we, ARTHUR E. GOURDIER, CHARLES B. EGGLESTON, and GEORGE M. GOURDIER, citizens of the United States, residing at Santa Cruz, in the county of Santa Cruz, California, have invented certain new and useful Improvements in Thermostatic Electric-Motor Protection, of which the following is a specification.

This invention relates to motors of the electric type, and the primary object of the invention is to provide a novel protecting system for electric motors for opening the circuit when the motor becomes overheated from any cause, thereby preventing the burning out of the motor and the consequent saving of time, labor and money incident to the rewinding of the fields and armature thereof.

Protecting devices for motors have already been constructed in the art and are in use on the market, but these devices merely include switches for opening the circuit, when the current rises or falls above or below a predetermined value and do not contemplate means for permitting the opening of the circuit when the motor becomes overheated for internal reasons, such as hot bearings, the armature scraping against the field coils and the like.

It is therefore another prime object of the invention to provide means sensitive to heat incorporated directly with the motor for opening the circuit, when the motor becomes overheated for any reason, beyond a predetermined degree, thereby effectively preventing the burning out of the motor from any cause.

A further object of the invention is the provision of a plurality of thermostatic switches, embedded or associated with the stator or laminated field frame of a motor at advantageous points, and connected in series with a no voltage release, so that when the motor becomes overheated from any cause, the current will be broken through the no voltage release coil winding, causing the starting switch to automatically return to its open or starting point.

A further object of the invention is the provision of novel means for incorporating the thermostatic switches in the circuit and in the stator, said thermostatic switches being disposed in pockets or openings extending parallel with the slots for the windings and in relative close proximity thereto, so that any heat generated will be transmitted readily to the said thermostatic switches.

A still further object of the invention is to provide a novel protecting device for motors of the above character, which will be durable and efficient in use, and one which can be incorporated with existing motors as well as those in the course of manufacture.

With these and other objects in view, the invention consists in the novel construction, arrangement and formation of parts, as will be hereinafter more specifically described, claimed and illustrated in the accompanying drawings, forming a part of this specification, in which drawings:

Figure 3 is an end elevation of a motor, partly in section, showing one of the thermostatic switches in the field thereof.

Figure 4 is an enlarged fragmentary transverse section through the laminations of a motor field showing the thermostatic switch and the means of incorporating the same with the said field laminations, the view being taken on the line 4—4 of Figure 5.

Figure 5 is a section similar to Figure 4, taken on the line 5—5 of Figure 4, showing a plan view of one of the thermostatic switches.

Referring to the drawings in detail, wherein similar reference characters designate corresponding parts throughout the several views, A indicates an induction motor; B, the circuit therefor; and C, the improved protecting device incorporated with the motor A and the circuit B.

Figure 1:
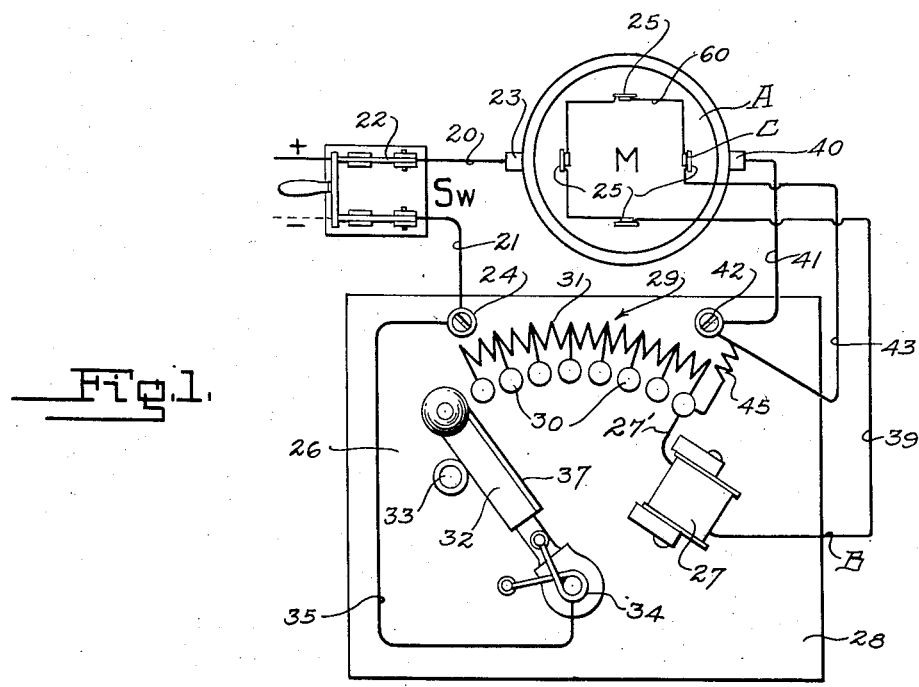
Figure 1 is a diagrammatic view of the wiring circuit for an electric motor showing the improved motor protecting system incorporated therewith.
Figure 2:
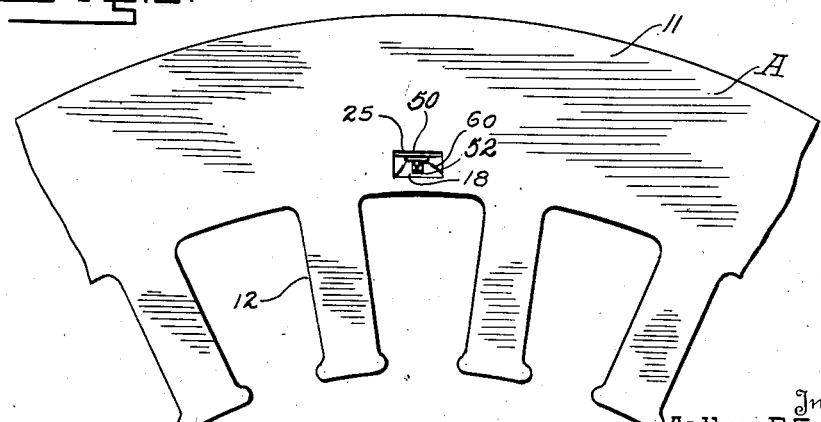
Figure 2 is a fragmentary side elevation of the frame or core of the field illustrating the position and arrangement of one of the thermostatic switches in relation thereto.

The motor A can be of any preferred type or size, and as shown includes the main frame 10, and the field frame 11 provided with cross slots 12 for the field coils 13. The field frame is connected to the main frame 10 in any preferred manner, and the main frame may be provided with end plates 14 carrying bearings 15 for supporting the armature shaft 16 of the armature 17. The field frame 11 is provided at quarters with transversely extending openings 18, in which are adapted to be positioned the thermostatic switches 25 forming a part of the protecting system C. These thermostatic switches are carried by the field frame in the plane of the armature 17 so that if the armature rubs on the field poles the heat caused by friction will quickly be transmitted to the thermostatic switches. These openings 18 can be stamped into the laminations of the field frame at the time of the forming thereof, or if the motor is of the usual type, the openings may be bored into the same. While only four openings have been shown and consequently only four thermostatic switches, it is to be understood that more or less openings and thermostatic switches may be had, if desired, according to the type of the motor. These openings are disposed at the upper and lower ends, and at the sides of the field frame, outwardly of the field coils 13, but relatively close to the inner walls of the slots 12. The openings 18 are formed relatively near the inner walls of the slots, so that the thermostatic switches 25 disposed therein will be readily affected by heat formed in the motor.

The circuit B consists of a pair of line wires 20 and 21 which may lead from any suitable source of power and these line wires have interposed therein any suitable type of knife switch 22. The wire 20 leads directly to one binding post 23 of the motor, while the other wire 21 leads to a binding post 24 of the starting box or switch 26 of the motor. This switch is of the usual type and embodies the no-voltage release 27 and this switch and no-voltage release will only be briefly described.

The starting switch 26 includes the usual base plate 28, on which is mounted the rheostat 29, which includes any preferred number of contact buttons 30 connected by the various resistance coils 31 and a switch lever 32, which is normally held open or in its off position against the stop 33 by a spring 34. This switch lever is connected to the binding post 24 by a suitable wire 35. The inner contact button 30 of the rheostat 29 is electrically connected to one terminal of the no voltage release 27 by a wire 27'. The no voltage release simply consists of an electromagnet, the armature 37 of which is carried by the switch lever 32. The other terminal of the electromagnet has connected thereto a wire 39 which is connected with the protecting system C which will be hereinafter more specifically described. The other binding post 40 of the motor has connected thereto the wire 41, which is in turn connected to the other binding post 42 of the starting switch 26. This binding post, in turn, has a wire 43 connected therewith, which is connected with the protecting system C. The no voltage release may be shunted by a small resistance 45 with the wire 41.

The improved protecting system C includes the thermostatic switches 25 as heretobefore stated, and each one of these thermostatic switches includes a base plate 50 preferably formed of electrical conducting material. The base plates are secured to the inner walls of the opening 18 and are preferably insulated from the field frame 11 by means of strips of insulation 51. The base plates 50 have riveted or otherwise secured thereto the active arms 52 of the thermostats, and these arms are preferably formed of electric conducting material having a relatively high co-efficient of expansion. The free end of each arm 52 is provided with a platinum contact point 53, which is adapted to engage a platinum contact point 54 carried by an adjustable post 55, which is threaded into engagement with a supporting block 56, which can be riveted or otherwise secured to each base plate 50. A suitable strip of insulation 57 is interposed between the block 56 and the base plate 50 so as to insulate the base plate and block from each other. The active arm 52 of the thermostatic switch is so formed as to normally hold the contact point 53 into engagement with the contact point 54 and to move the contact point 53 away from the contact point 54 when the same is affected by heat, of a predetermined degree, which can be determined by the manufacture of the motor. These thermostatic switches 25 are connected in series, by relatively short wires 60, and one end thermostatic switch is connected with the wire 43, while the other end thermostatic switch is connected with the wire 39.

In operation of the improved protecting system, the motor is started in the usual way, that is, the starting switch lever 32 is gradually moved over the contact buttons 30 and toward the no-voltage release and to the innermost contact button. At this time, the armature 37 of the electromagnet 27 will be in engagement with the electromagnet and this magnet will become energized and hold the lever in its closed position against the tension of the spring 34. When the switch lever 32 is moved over to its operative position, the current will flow through the wire 20 to the winding of the motor and from the motor through the wire 41 to the binding post 42. From the binding post 42 the current passes to the rheostat and when the switch lever 32 is in engagement with one of the contact points of the rheostat the current will pass through this arm and through the wire 35 to the contact post 24 and through the wire 21 back to the switch. A certain portion of the current will be held back by the resistance 45 and this current will pass through the wire 43 and through the thermostatic switches 25 and wire 39 to the no voltage release magnet 27 and 27' to the inner contact post of the rheostat. It will thus be seen that the no voltage release magnet will be energized and will act upon its armature 37 carried by the switch lever 32 to retain the switch lever in the set position. If the motor becomes overheated from any cause beyond a predetermined degree, one or all of the thermostatic switches will be operated, thus opening the circuit through the no voltage release 27, allowing the switch lever 32 to move automatically back to its off position against the stop 33 by the spring 34 and open the circuit through the motor. This will effectively prevent injury to the motor and prevent the windings of the motor from being burned out. It can be seen that the thermostatic switches 25 are disposed in the plane of the armature to be readily affected by heat, if the heat is generated from frictional contact between the armature and field, thus effectively guarding the motor from injury due to faulty armature shaft bearings.

Changes in details may be made without departing from the spirit or scope of this invention; but,

We claim:

1. An electric motor including a stator having a field frame, an armature, and a thermostatic switch carried entirely within said field frame, in the plane of the stator.

2. An electric motor including a stator having a field frame and coils, an armature, and a thermostatic switch carried entirely within said field frame, in the plane of the stator and outermost with respect to the coils.

3. The combination with an electric motor including a stator having openings formed transversely therethrough in relatively close proximity with the inner face thereof, of a plurality of thermostatic switches disposed in said openings.

4. The combination with an electric motor including a stator having slots therein for the field coils, of a thermostatic switch embedded in the stator outwardly of the said slots, and intermediate the side walls of the slots.

5. The combination with an electric motor including a stator having slots therein for the field coils and an opening extending transversely through the stator disposed outwardly of the slots and intermediate the side walls thereof and in relatively close proximity to the inner wall of the slot, of a thermostatic switch disposed in said openings.

6. The combination with an electric motor including a stator having slots formed in the inner face thereof for the reception of the field coils, and a transversely extending opening disposed outwardly of the slot intermediate the side walls thereof and in relatively close proximity to the inner wall thereof, of a thermostatic switch having a base plate and an active arm, a contact point carried by the base plate, a contact point carried by the active arm normally in engagement with the first mentioned contact point, the base plate being secured to the outer wall of the opening and the active arm disposed in relatively close proximity to the inner wall of the opening.

ARTHUR E. GOURDIER.
CHARLES B. EGGLESTON.
GEORGE M. GOURDIER.